INVENTOR:
PERCY E. A. COWLEY
BY: James Todorovic
HIS ATTORNEY

INVENTOR:
PERCY E. A. COWLEY
BY: James Todorovic
HIS ATTORNEY

April 6, 1965

P. E. A. COWLEY 3,177,347

METHOD AND APPARATUS FOR DETERMINING THE
DYNAMIC RESPONSE OF A SYSTEM

Filed Feb. 25, 1959

INVENTOR:
PERCY E. A. COWLEY
BY: *James Todorovic*
HIS ATTORNEY

United States Patent Office 3,177,347
Patented Apr. 6, 1965

3,177,347
METHOD AND APPARATUS FOR DETERMINING THE DYNAMIC RESPONSE OF A SYSTEM
Percy Edward A. Cowley, Walnut Creek, Calif., assignor to Shell Oil Company, a corporation of Delaware
Filed Feb. 25, 1959, Ser. No. 795,538
25 Claims. (Cl. 235—151)

This invention pertains to systems and more particularly to a method and apparatus for determining the dynamic response of a system, i.e., of any process or mechanism, which is to be controlled or which is controlled. The invention may also be used for extracting a sinusoidal wave from a noisy signal where the frequency of the sinusoidal signal is known.

At the present time when it is desired to determine the dynamic response of a system and write a transfer function which adequately describes the dynamic response of the system it is necessary to apply a disturbance to the system and visually observe the response of the system to the disturbance. It is customary to apply either a sinusoidal wave disturbance or a step-type disturbance to a control element of the system and then measure and record the effect of this disturbance on appropriate variables in the system. For example, in a control system which controls the heat input to a chemical process one could vary the setting of the valve controlling the supply of heating medium for the process and then observe the effect of this disturbance on the process temperature, process pressure, product quality, and other process variables. While many means may be used for recording the change in the process variables it has been the customary practice to record on a chart record both the input disturbance to the process and the change in the process variables. In the case where a sinusoidal wave disturbance is applied one may then by means of visual inspection of the chart record determine both the amplitude and the phase shift of the response of the variable to the disturbance. Knowing the amplitude and phase shift of the response over a suitable range of frequencies one can then develop a transfer function including the various time constants, dead time, and gain factors, which adequately describe the dynamic response of the control system.

While this method of determining the dynamic response of a system is adequate in many cases, in many other cases it is entirely inadequate. Inadequacy results from the fact that the noise in many systems completely obscures any response of the system variables to the input disturbance at the higher sinusoidal frequencies. In the usual case, whenever the amplitude of the system noise equals the amplitude of the input disturbance it is impossible to determine accurately the amplitude and phase shift of the system response to the input disturbance.

A further inadequacy of the above-mentioned method arises in those processes having automatic control wherein the control cannot be removed for safety reasons or other reasons. In this type of process the noise will obscure the process input at low frequencies and will obscure the response of the process variable at high frequencies. Thus, usable records will be obtained at only the middle frequencies which will provide insufficient data to adequately describe the dynamic response of the process. While it would appear that a simple solution of this problem would be to increase the amplitude of the input disturbance, this is impossible in many systems since a large amplitude disturbance will completely upset the system.

Accordingly, it is the principal object of this invention to provide an improved method for determining both the amplitude and phase shift of the response of a system to an input disturbance.

A further object of this invention is to provide an improved method for determining both the phase shift and amplitude of the response of a system to a disturbance which is capable of operating under adverse noise conditions.

A further object of this invention is to provide an improved apparatus which is capable of solving various equations in order to supply an output from which one may determine both the amplitude and phase shift of the response of a system to an input disturbance.

A still further object of this invention is to provide an apparatus capable of solving the various equations necessary to determine the dynamic response of a system, which apparatus includes a novel means for correcting the normal drift of the system.

A still further object of this invention is to provide a novel means for removing the component representing the normal system drift from a signal representing the response of system to an input disturbance.

A still further object of this invention is to provide a means for applying a sine wave disturbance to a system, measuring the response of preselected system variables to the disturbance, and then filtering the system response to remove the normal system drift. The response of each system variable is then correlated with both the original sine wave disturbance and a companion cosine to obtain two vectors these are vectorially added to provide a single vector whose length is proportional to the amplitude of the response of the system variable and whose phase angle is proportional to the phase lag of the response of the system variable.

A still further object of this invention is to provide an improved means by which a sinusoidal wave may be extracted from a noisy signal providing the frequency of the sinusoidal wave is known.

Realization of the above and other objects of this invention results from the discovery that by individually correlating each input disturbance with the response of the individual system variable to the disturbance for zero time delay, one obtains the amplitude and phase shift of the response of the variable to the input disturbance for the particular frequency of the disturbance. By varying the frequency of the disturbance one can obtain the same information for a plurality of frequencies and thus a plurality of points on the response curve. While the correlation technique has been used in the past to permit one to extract a sine wave from a noisy response, the prior work was limited to correlation with variable delay in order to obtain the complete correlation curve. This is a very difficult calculation to perform since analog computers having pure delay do not exist and thus various methods must be improvised in order to solve the problem. It was made practicable by the discovery of the fact that one only needed to cross-correlate the input disturbance with the system response for a zero time delay to obtain the amplitude and phase shift of the system response to the input disturbance. This is a relatively simple problem to solve on modern computers and may be accomplished on either analog or digital computers. While each correlation results in only a single point on the system response curve, by varying the frequency of the disturbance one can obtain additional points. By plotting the amplitude and phase shift of the response for various frequencies, two curves are obtained. From these curves it is a simple operation to write a single transfer function which completely describes the response of the system.

More particularly the object of this invention is obtained by providing a sine wave input disturbance for a system. The particular character of the sine wave disturbance will vary depending on the system, e.g., for a system using pneumatic controls the sine wave should have a pneumatic character. Likewise, the particular point at which the sine wave disturbance is induced into the system will vary according to the system. An analog of the sine wave disturbance is generated as well as an analog for the cosine of the disturbance. The since and cosine analogs are supplied to a multiplying means which is also supplied with an analog of the response of a preselected variable of the system in which one is interested. The response of the variable is passed through a filter to remove the normal system drift which is present in all of the variables in the system. The system response is multiplied by the sine and the cosine and then the separate products of the multiplication are integrated over a period of at least a few cycles of the input disturbance. The results of the integration are recorded on a chart recorder and the slopes of these records are proportional respectively to the sine and cosine components of the system response. One only has to add vectorially these sine and cosine components to obtain a vector whose magnitude is proportional to the amplitude of the system response and whose phase angle is proportional to the phase shift of the system response. As explained above, if one varies the frequency of the input disturbance one may obtain the amplitude of system response and phase shift over a wide range of frequencies which will permit one to write a transfer function for the system including suitable time constants, dead time and gain.

The above objects and advantages of this invention will be more easily understood by those skilled in the art to which it pertains from the following detailed description of the invention when taken in conjunction with the attached drawings in which.

Figure 1:
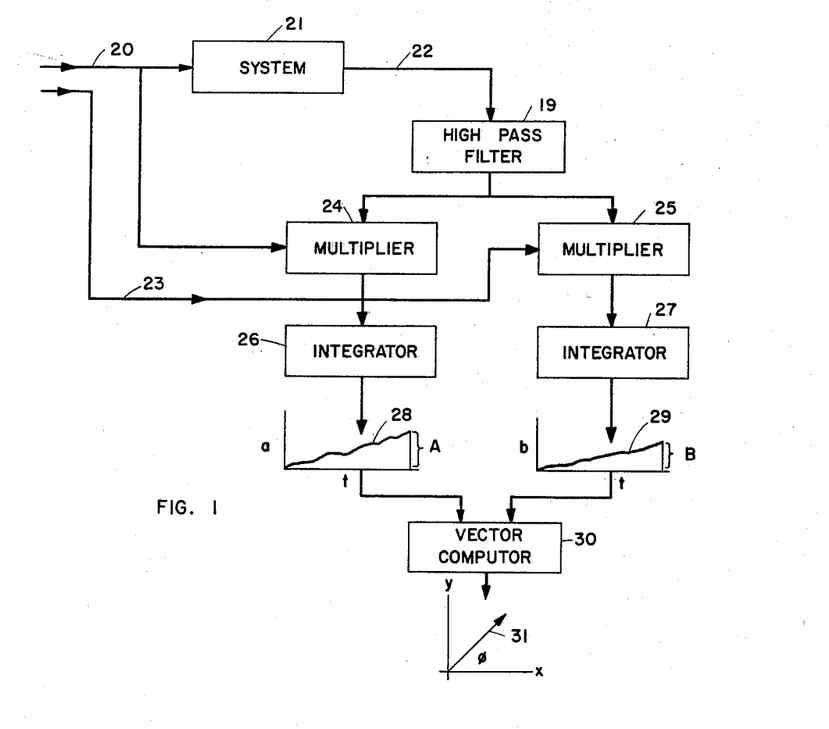
FIGURE 1 is a block diagram illustrating the principle of this invention with the output of the integrating means being vectorially added.

Referring now to FIGURE 1, there is shown a transmission line 20, e.g., a circuit or duct, by which an input disturbance is supplied to a system or process 21. The input of the disturbance has the form $A \sin \omega t$ and may be in any desired physical form as long as it is capable of disturbing the system 21. In this expression, "A" is the amplitude of the disturbance, "$\omega$" the frequency expressed in radians per unit time, and "$t$" the time. Likewise the system 21 may be a control system, a servo-mechanism, a regulator or any other apparatus whose dynamic response is desired. Of course, the same disturbance must also be supplied to the remainder of the measuring system as an analog having the same properties as in the remainder of the system. The response of a particular variable of the system to the disturbance is supplied as an analog signal to the remainder of the system by a transmission line 22 and has the form $a \sin (\omega t + \phi)$. In this form "$a$" represents the changed amplitude of the original disturbance and $\phi$ the phase shift of the original disturbance. The response is passed through a high-pass filter 19 to remove the normal drift of the system since the normal drift of a system compares in effect to very low frequency oscillations. The companion cosine of the input disturbance is supplied as an analog signal via a transmission line 23 and has the form $A \cos \omega t$. The analog of the input disturbance in the line 20 and the analog of the system response in line 22, after filtering, are both supplied to a multiplier 24 where they are multiplied, and the result is supplied as a signal to an integrating circuit 26. The integrating circuit 26 integrates the product of the multiplication over a time interval equal at least to a few cycles of the frequency of the input sine disturbance. By a few cycles is meant at least 5 to 15 cycles or in any case sufficient cycles to allow the result of the integration to assume a determinable slope. The output of the integrator 26 is recorded on a chart recorder to give a chart record 28. The companion cosine wave of the sine wave is supplied to a multiplier 25 which is also supplied with the system response in the line 22 after filtering. The product of the multiplier 25 is supplied to an integrator whose output is recorded on a chart record 29 in the same manner as that described above for the since wave in the line 20. The chart recorders are preferably strip chart recorders which record the amplitude of a signal with respect to time. As shown in FIGURE 1, the signal $a$ or $b$ is recorded along the ordinate while time $t$ is recorded along the abscissas. Also in FIGURE 1, A and B denote the amplitude of the signals $a$ and $b$ received from the integrating circuits 26 and 27 at a time $t$. The slopes A and B of the two chart records 28 and 29, respectively, are determined by a vector computer 30 which then vectorially adds these two slopes to give a single vector 31 on an $xy$ recorder. The vector is drawn with a length proportional to the magnitude of the system response and a phase angle $\phi$ equal to the phase shift of the system response. While the various signals supplied to calculating portions of the system may have any desired form such as pnuematic, mechanical, or electrical, it is usually preferred to supply them in the form of electrical analogs. Also the computer 30 may be a digital computer which is programmed to first determine the slopes of the signals $a$ and $b$ of the two chart records 28 and 29 and then combine the slopes to obtain the amplitude and polar angle of the resulting vector.

In order better to understand the above method it will be assumed that the input disturbance and system response have the form described above. Thus, the multiplier 24 will be multiplying the following quantities:

$$A \sin \omega t [\alpha \sin (\omega t + \phi)] \tag{1}$$

This is, of course, true only in cases where the cutoff frequency of the filter 19 is chosen so that the filter attenuation and phase shift are negligible. Alternately one could later correct for the filter attenuation and phase shift. If the term within the brackets above is expanded and the constant $a$ combined with constant A one would obtain the following equation $$Aa \sin \omega t [\sin \omega t \cos \theta + \cos \omega t \sin \theta] \tag{2}$$

From an inspection of the function 2 it can be seen that the terms $\cos \theta$ and $\sin \theta$ are constants and, accordingly, this function may be rewritten as follows, where $c$ and $d$ are constants $$aA \sin \omega t [c \sin \omega t + d \cos \omega t] \tag{3}$$

Multiplying the above function one obtains the following function $$aAc \sin^2 \omega t + aAd (\sin \omega t \cos \omega t) \tag{4}$$

From an inspection of the above function it can be seen that the average value over any multiple of a half period $$\frac{\pi}{\omega}$$

of the term $\sin \omega t \cos \omega t$ is equal to zero and, accordingly, this term of the function drops out. Accordingly, the output of the multiplier 24 has the following form $$aAc \sin^2 \omega t \qquad (4a)$$

at each and every half-period point in time excepting for random deviations due to noise. Between the half-period points the output of the multiplier 24 will deviate alternately positively and negatively about the value of (4a) due to the second term of (4). An alternative mathematical representation 4a is:

$$aAc\frac{1}{2}(1-\cos 2\omega t) \qquad (5)$$

This quantity is applied to the integrator 26. The integration of the first term will result in the quantity $$\frac{aAct}{2} \qquad (5a)$$

while the integration of the second term will result in an oscillatory term $$-\frac{1}{4}\frac{aAc}{\omega} \sin 2\omega t \qquad (5b)$$

which will have a zero value at any time which is a multiple of $$\frac{\pi}{\omega}$$

Thus the integrating circuit 26 will result in a chart record 28 in which the average slope is given by the coefficient of $t$ in (5a), vis., $$\frac{1}{2}aAc$$

From an inspection of the function 5a it is seen that it includes a factor $c$ which is a constant proportional to the cosine of the process phase shift $\theta$. Thus the slope of the chart record 28 will be proportional to the cosine of the phase shift $\theta$.

If one performs the above mathematics for the correlation of the cosine term it would result in the following function.

$$\frac{aAd}{2}t$$

This result includes the factor $d$, which is proportional to the sine of the phase shift angle $\theta$. Thus when the results of the two integrators 26 and 27 are vectorially added a single vector 31 is obtained whose amplitude is proportional to the amplitude of the system response and whose phase angle $\theta$ is equal to the phase shift of the system response.

It is thus seen that the above-described combination of devices permits one to obtain both the amplitude and phase of the response of system 21 to an input disturbance even under adverse noise conditions. The noise being random in nature, it is cancelled in the integration step, leaving only the system response. If the high-pass filter were not used, the normal system drift would change the slope of the chart records 28 and 29 and introduce a considerable error in the final result. The normal drift is in effect a low-frequency disturbance having a period materially longer than the period of the input disturbance in the line 20; thus it would introduce a considerable error into the slope of the chart records 28 and 29. The integrating step will not remove the normal drift since it is in effect uniform over the time in question and not random as in the case of noise. The high-pass filter also removes from the response fed to the multipliers any effect due to any sudden changes in the level of system response since these changes are substantially direct-current in nature.

Figure 2:
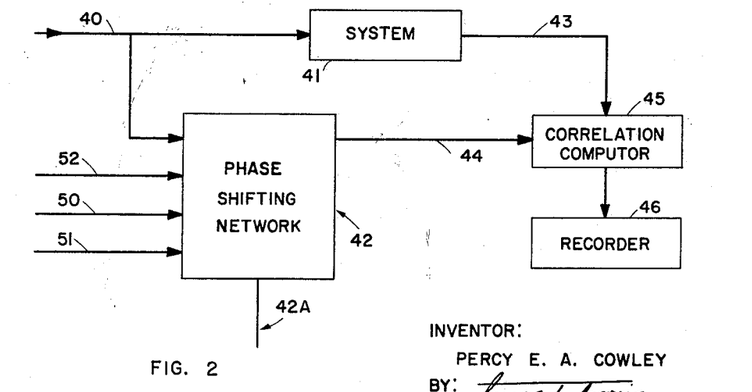
FIGURE 2 is a block diagram of a second embodiment of this invention showing a phase shifting means for correlating the input disturbance with the system output to achieve a null condition.

Referring now to FIGURE 2, there is shown a block diagram of an apparatus for obtaining the dynamic response of a system 41 by means of a phase-nulling method. In this embodiment only one multiplier and one integrator are used to perform, in succession, the functions of the devices 24-27 of the first embodiment. In this apparatus the input disturbance in the transmission line 40, which has the form $A \sin \omega t$, is supplied to the system 41 and to a phase shifting network 42. The phase-shifting network 42 is also supplied with three additional inputs 50, 51 and 52 which are the negative sine, the cosine and the negative cosine of the input disturbance in the line 40. The network 42 has a phase dial 42A by which the phase of the output signal in the line 44 can be set. The output from the system 41, which has the form $a \sin (\omega t+\theta)$, is supplied via a line 43 to correlating circuit or computer 45 which includes the filter and which is also supplied with the output from the phase shifting network 42. The correlating computer 45 performs the same functions as the multiplying and integrating circuits described above for FIGURE 1. The output in the line 44 from the phase shifting network 42 has the form $$A \sin (\omega t+\theta)$$

where the phase angle $\theta$ is obtained by appropriate setting of the phase dial 42A on the phase shifting network 42. By varying the phase shift of the signal in the line 44 through the use of the phase dial 42A, one can reach a position where the phase of the signal from the phase shifting network 42 differs by $$\frac{\pi}{\omega}$$

from the phase of the output signal 45 from the system in the line 43 and the signal from the correlation computer 45 has a zero average magnitude. The balance condition or null point can easily be determined by observing the chart recorded on a recorder 46 which is connected to the output of the computer 45, since the curve drawn on this chart will have zero slope when the null point is reached. The phase dial 42A of the phase shifting network 42 is then shifted 90 degrees to a position in which the phase shift is $\theta_1$. In this shifted position the response of the correlation computer 45 is observed on the chart recorder 46 in a similar manner to that described above in FIGURE 1. The average slope of the chart record from the recorder 46 will be $$\frac{1}{2}aA$$

from which the amplitude $a$ is readily determined. The phase angle of the system $\phi$ is equal to the phase dial reading $\theta_1$ if the above slope is positive or $\theta_1 \pm \pi$ if the above slope is negative.

Figure 3:
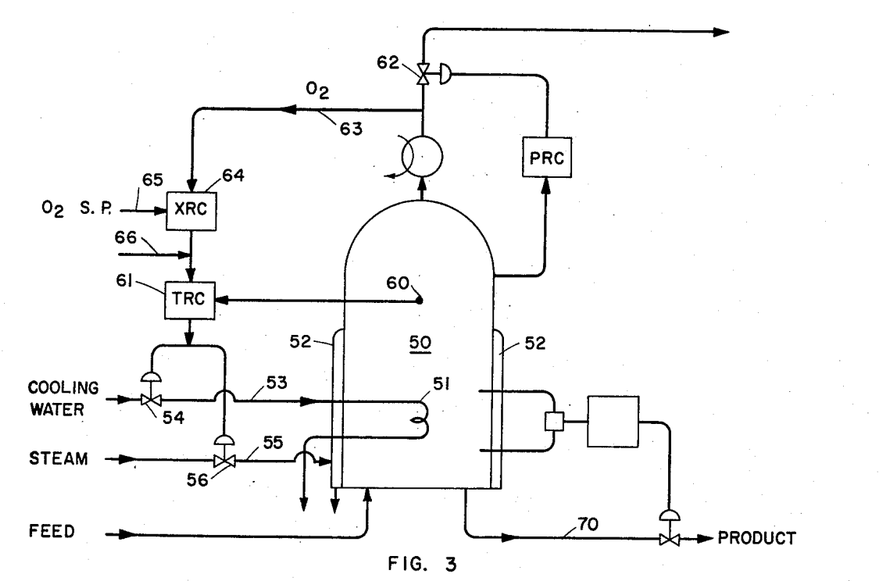
FIGURE 3 illustrates a schematic drawing of an actual process showing the application of this invention thereto for determining the dynamic response of the control system of the process.

Referring now to FIGURE 3, the method of this invention is shown applied to an actual process in which liquid isopropyl alcohol was reacted with oxygen to yield hydrogen peroxide. This reaction must proceed under accurately controlled temperatures and pressures since the reaction is exothermic and would tend to run away in the absence of an accurate control system. This method of making hydrogen peroxide is more completely described and claimed in U.S. Patent No. 2,871,104, issued January 27, 1959, and entitled "Manufacture of Hydrogen Peroxide." The reactants are reacted in a pressure vessel 50 which is provided with a cooling coil 51 and a steam heating jacket 52. The cooling water is supplied through a line 53 having a control valve 54 while the steam is supplied through a line 55 having a control valve 56. The control valves 54 and 56 are controlled by the temperature controller 61 which responds to the temperature in the pressure vessel as sensed by a temperature sensing element 60 and to a set-point signal from an oxygen controller 64. The oxygen controller 64 is supplied with a certain set point 65 in order to control the oxygen concentration of the gases vented from the pressure vessel 50 via the vent valve 62 mounted on the top of the vessel. The reactants are fed into the bottom of the pressure vessel 50 and removed from both the side and bottom and delivered as an end product through a line 70.

In order to accurately determine the dynamic response of the control system of the above reaction process, the pneumatic signal from the oxygen controller 64 to the temperature controller 61 was broken and a new signal which included both the set point signal of the temperature controller corresponding to that previously supplied from the controller 64 plus a sinusoidal disturbance signal was introduced via the line 66. The following four parameters which indicate the response of the system to the disturbance were then measured: (1) the temperature in the pressure vessel by means of element 60, (2) the oxygen concentration of the flow through the venting valve 62 of the vessel 50, and (3 and 4) the positions of the two control valves 54 and 56.

Figure 4:
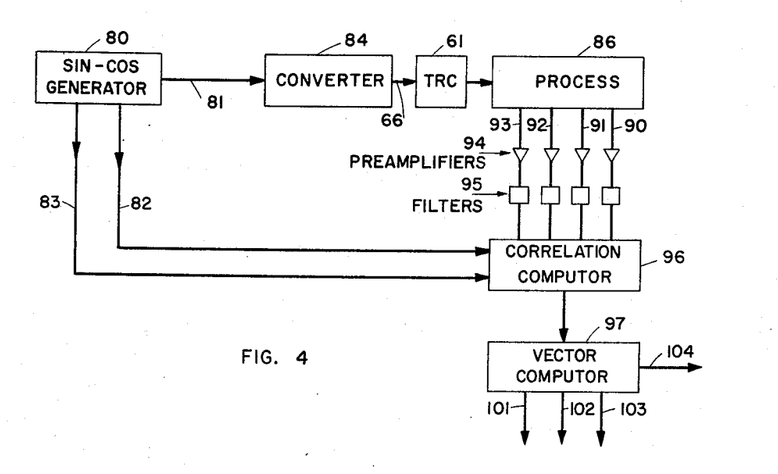
FIGURE 4 is a block diagram of this invention as applied to the process shown in FIGURE 3.

Referring now to FIGURE 4, there is shown a block diagram of this invention as applied to the process shown in FIGURE 3 in which 80 is a sine-cosine generator. The sine signal in the circuit 81 from the sine-cosine generator is supplied to a converter 84 which converts the electrical signal into the proper pneumatic signal for combining with the signal from the oxygen controller 64 of FIGURE 3. The combined signal in the line 66 is then supplied to the temperature controller 61 of FIGURE 3 which in turn supplies the signal to the process 86 through flow control valves 54 and 56 of FIGURE 3. The sine-cosine generator also supplies an additional sine and an additional cosine signal via lines 82 and 83, respectively, to a correlation computer 96. Four signals derived from the process and representing process variables of interest, are transmitted via lines 90, 91, 92, and 93, respectively, through preamplifiers 94 and thereafter through filtering circuits 95 and finally to the correlation computer 96. The correlation computer 96 computes the two correlation functions as explained above with reference to FIGURE 1 for each of the separate process signals and supplies the information to a vector computer 97. The vector computer vectorially adds the two correlation functions and supplies the amplitude and phase angle of separate vectors via circuits 101, 102, 103 and 104 corresponding to the various inputs in lines 90, 91, 92 and 93. The electrical signals in the several circuits 101, 102, 103 and 104 corresponding to the individual inputs can be recorded on an xy chart recorder or similar instrument. The details of the filter circuit 95 and correlation computer 96 and sine-cosine generators 80 are shown in greater detail in FIGURES 5, 6, and 7 and will be described below. The use of a filter circuit 95 is very important since it eliminates the steady drift of the various process parameters. In order to accomplish this, the filter circuit is preferably in the form of a high-pass filter since the steady state drift contains low frequency components.

From the above description it can be seen that the process is supplied with a sine wave disturbance and its response determined by the same means as described with reference to FIGURE 1. The operation of the system to determine the responses of four variables of the system is substantially the same as FIGURE 1 except that the correlation computer must have four individual channels and suitable means for supplying the information to a chart recorder capable of recording four individual channels. Instead of individual channels, the same results can be obtained by using a single channel on a time-sharing basis.

Figure 5:
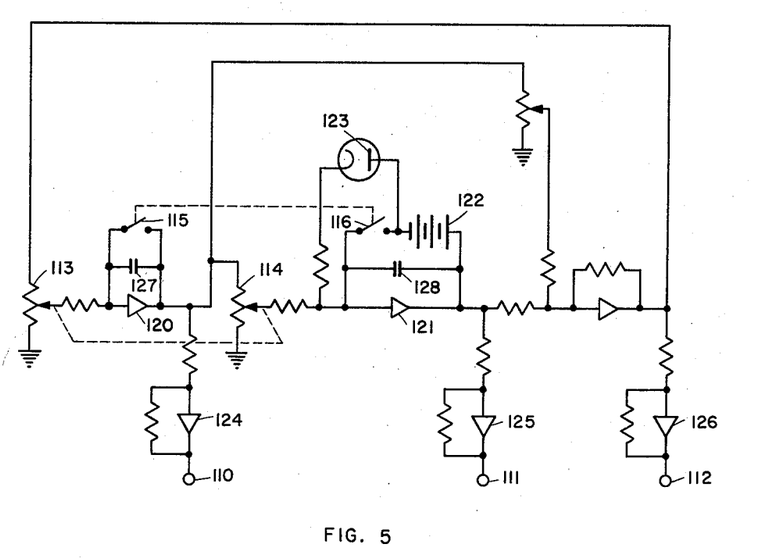
FIGURE 5 is a schematic drawing of one means for generating a sinusoidal disturbance and its companion cosine signal.

Referring to FIGURE 5, there is shown a schematic diagram for wiring an analog computer to supply a sine, cosine and negative cosine function for the above-described method. The diagram shown in FIGURE 5 is arranged so that it will solve the harmonic equation $$\frac{d^2x}{dt^2}+\omega^2x=0$$

There is considerable value in applying a small amount of negative damping and thus limiting the oscillation build up in this equation. The damping may be provided by including an additional term such as $$\frac{2k\omega dx}{dt}$$

in the above harmonic equation. As shown in FIGURE 5, the sine output appears at the terminal 110, the positive cosine at the terminal 112 and the negative cosine at the terminal 111. The frequency of the oscillating output is determined by the ratio of the two potentiometers 113 and 114 which may be adjusted to obtain the desired frequency. The ratio of each potentiometer 113 and 114 is the voltage at the sliders compared to the voltage at the top of the potentiometers. As the sliders of the two potentiometers 113, 114 are moved in unison from the top to the bottom the frequency of the generator will change from an initial fixed value to near a zero value. The initial frequency obtained when both potentiometers are effectively removed from the circuit will be determined by the remaining characteristics of the circuit. Amplifiers 124, 125 and 126 are respectively connected in series with terminals 110, 111 and 112 in order to remove the load on the integrating amplifiers 120 and 121. Also included in the feedback loop of the amplifier 121 is a battery 122 and diode 123. It should be noted that the plate of the diode is connected to the negative side of the battery, thus the diode will act to limit the oscillation build-up of the circuit by providing an additional feedback path whenever the amplitude of the feedback voltage exceeds the potential of the battery 122. The battery 122 with capacitors 127 and 128 provide a means for starting the computer through the use of switches 115 and 116.

While an analog computer is shown and described above with reference to FIGURE 5 as a means for obtaining the sine and cosine functions required for this invention many other means may also be adapted. For example, it is possible to use sine and cosine potentiometers which are driven by suitable motor means, additional means being provided for varying the speed of the motor to provide the necessary frequency range.

Figure 6:
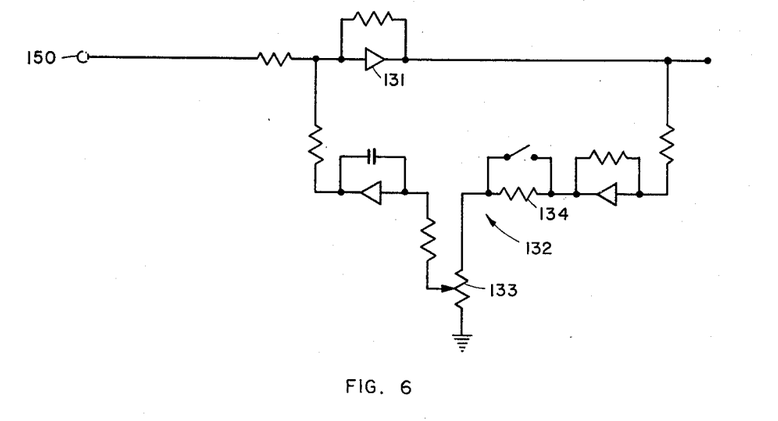
FIGURE 6 is a schematic drawing of a filter used as a drift correcting circuit in FIGURE 4.

Referring now to FIGURE 6, there is shown a schematic diagram for an analog computer wired to provide the drift eliminating filter described above with reference to FIGURES 1, 2, and 4. The drift elimination filter circuit employs an amplifier 131 arranged to act as ratio multiplying circuit with a portion of the output of the amplifier 131 being fed back to the input of the amplifier 131 through a multiplying and integrating circuit 132. The time constant of the integrating circuit is selected so that the output from the feedback circuit will be substantially out of phase with the low frequency components of the input signal to the amplifier 131 and thus effectively cancel these low frequency components. The cutoff frequency of the filter may be adjusted by the use of resistances 133 and 134. As explained above, the use of a drift-eliminating circuit improves the accuracy of the device. In fact, in cases of serious drift in the process under investigation the error induced by the drift would be greater than the response of the process and thus render the result completely unusable.

Figure 7:
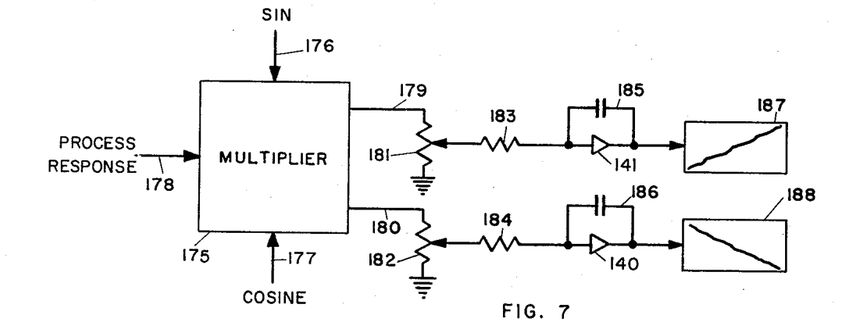
FIGURE 7 is a schematic drawing showing an analog computer means for correlating the input disturbance means with the process response.

Referring now to FIGURE 7 there is shown an arrangement by which the various functions may be multiplied together and then integrated with the final result being recored on a recording galvanometer or chart recorder. The multiplier 175 may be of any suitable type, e.g., a mechanical multiplier or an analog computer type multiplier employing operational amplifiers as is well known in the art. This multiplier has input lines 176, 177 and 178 by which the disturbance (a sine wave), the cosine corresponding thereto, and the process response, respectively, are supplied. The multiplier generates two products, which are, respectively the response multiplied by the sine and the response multiplied by the cosine. These products are supplied via output circuits 179 and 180, respectively, grounded potentiometers 181 and 182, and resistors 183 and 184 to two additional operational amplifiers 140 and 141 which have feed-back circuits 185 and 186 and are disposed to integrate the individual outputs of the multiplier 175. The separate outputs of the two integrating amplifiers 140 and 141 are connected to separate chart recorders which record the integrals on charts 187 and 188.

Figure 8:
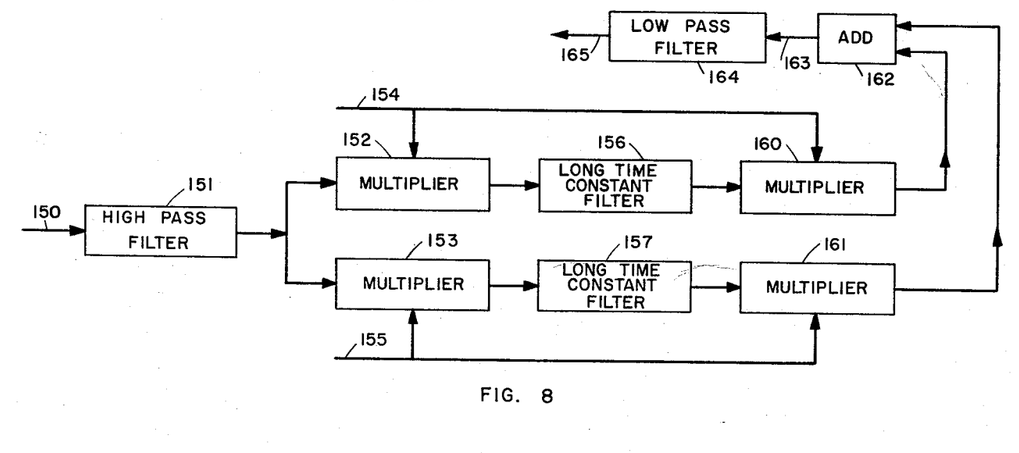
FIGURE 8 is a block diagram of one combination of devices for extracting a sinusoidal wave from a noisy signal where the frequency of the sinusoidal wave is known; and, FIGURE 9 is a block diagram of a second combination of devices for extracting a sinusoidal wave from a noisy signal.

Referring now to FIGURE 8, there is shown a block digram circuit for extracting a sinusoidal signal from a noisy signal when the frequency of the sinusoidal signal is known. This combination of elements uses multipliers and generates voltages of the type described with reference to FIGURE 1 and further combines these voltages in a form to permit display, e.g., on an oscilloscope. An electrical analog of the noisy signal in a circuit 150 is first passed through a high-pass filter circuit 151 similar to that shown in FIGURE 6. The output signal of the filter circuit 151 is supplied to two multiplying devices 152 and 153 where it is multiplied by a reference sine signal and cosine signal respectively. The reference sine and cosine signals may be supplied via input circuits 154 and 155, respectively, from any well known source such as an oscillator or sine-cosine potentiometer, providing that the frequency of the reference signals is the same as that of the sinusoidal signal.

The separate signals from the multipliers 152 and 153 are then passed through separate low-pass long time-constant filters 156 and 157, respectively. The signals from the two filters 156 and 157 are then passed through separate multipliers 160 and 161 where they are multiplied by the reference sine signal and cosine signal of the circuits 154 and 155. The outputs of the two multipliers 160 and 161 are added in a circuit 162. The output of the circuit 162 is the desired sinusoidal signal and appears in output circuit 163. It may be recorded or utilized in any desired manner preferably after passage through a low-pass filter 164 having an output circuit 165.

While no detailed circuits are described above for performing the various mathematical operations, many circuits are well known which are capable of performing these functions. For example, analog computers may be wired to perform these functions or sine-cosine potentiometers may be used to perform the multiplying steps, especially at low frequencies.

In order to understand the operation of the above circuit it will be assumed that a noisy signal representing the response of a process variable to a sinusoidal input distrubance and containing the following desired component, is supplied to the circuit 150:

$$a \sin(\omega t + \phi) \quad (6)$$

Let the high-pass filter 151 be adjusted so that the cutoff frequency $\omega_1$ is less than $\omega$ but such that a signal at frequency $\omega$ will be attenuated by a factor $b$ and shifted in phase by an angle $\alpha$, then the output of the high-pass filter is $$ab \sin(\omega t + \phi + \alpha) \quad (7)$$

If the sine and cosine reference signals in input circuits 154 and 155 are $A \sin \omega t$ and $A \cos \omega t$, respectively, then the multiplier outputs will be:

$$Aab \sin \omega t \sin(\omega t + \phi + \alpha) \quad (8)$$

$$Aab \cos \omega t \sin(\omega t + \phi + \alpha) \quad (8a)$$

which upon expansion become $$Aab \cos(\phi + \alpha) \sin^2 \omega t + Aab \sin(\phi + \alpha) \sin \omega t \cos \omega t \quad (9)$$

$$Aab \sin(\phi + \alpha) \cos^2 \omega t + Aab \cos(\phi + \alpha) \sin \omega t \cos \omega t \quad (9a)$$

The time constant of the long time-constant filters 156 and 157 are adjusted to be long enough so that the output contains only the smoothed version of the input (i.e. the average value). The output of the long time-constant filters will then be:

$$\frac{1}{2} Aab \cos(\phi + \alpha) \quad (10)$$

$$\frac{1}{2} Aab \sin(\phi + \alpha) \quad (10a)$$

The output of the multipliers 160 and 161 will then be respectively $$\frac{1}{2} A^2 ab \cos(\phi + \alpha) \sin \omega t \quad (11)$$

$$\frac{1}{2} A^2 ab \sin(\phi + \alpha) \cos \omega t \quad (11b)$$

and the output of the adder 162 in the circuit 163 will be $$\frac{1}{2} A^2 ab \sin(\omega t + \phi + \alpha) \quad (12)$$

This signal is recognized as the same quantity as the output of the high pass filter 151 (7) apart from the constant of proportionality $$\frac{1}{2} A^2$$

If now either the cutoff frequency $\omega_1$ of the high pass filter is adjusted to such a value that the attenuation $b$ and phase shift $\alpha$ are negligible or due allowance is made for $b$ and $\alpha$ in observing and measuring the output in the circuit 163, then the noise free sinusoidal signal has been obtained from the noisy input signal in 150.

Alternatively to using as the output the signal in the circuit 163, the latter may be passed through a low-pass filter 164 having the inverse filter characteristic. The output in the circuit 165 of the low pass filter 164 will then be $$\frac{1}{2} A^2 a \sin(\omega t + \phi) \quad (13)$$

Apart from the coefficient of proportionality, $$\frac{1}{2} A^2$$

the desired component of the noisy signal in circuit 150 has been recovered at the output circuit 165.

The noise components of the input signal in circuit 150 will appear at the output 163 or 165 only heavily attenuated, such that the output 163 or 165 is in effect noise free. Suppose the noisy signal in 150 contains an undesired component $c \sin(\omega_2 t + \phi_2)$, where $\omega_2$ is not identical to the frequency of the desired component $\omega$. Let the attenuation of the high-pass filter be $b'$ and the phase shift $\alpha'$. Then corresponding to expression (7) we have $$cb' \sin(\omega_2 t + \phi_2 + \alpha') \quad (14)$$

and corresponding to (8) and (8a), we have $$Acb' \sin \omega t \sin(\omega_2 t + \phi_2 + \alpha') \quad (15)$$

$$Acb' \cos \omega t \sin(\omega_2 t + \phi_2 + \alpha') \quad (15b)$$

Since $\omega_2$ is different from $\omega$, the long time average of the second terms of 15 and 15a will be zero. The time constant of the long time constant filter can always be made long enough to effectively attenuate any of the other components. The effective output of the long time-constant filters will thus contain only the average values of the expressions 15 and 15a, i.e., effectively zero for all frequencies $\omega_2$ other than for $\omega_2 = \omega$. This case has already been discussed above in the expressions 9 and 9a to 13.

The filters 156 and 157 are not restricted to being simple single time-constant filters but may be of any type of low pass filter.

Figure 9:
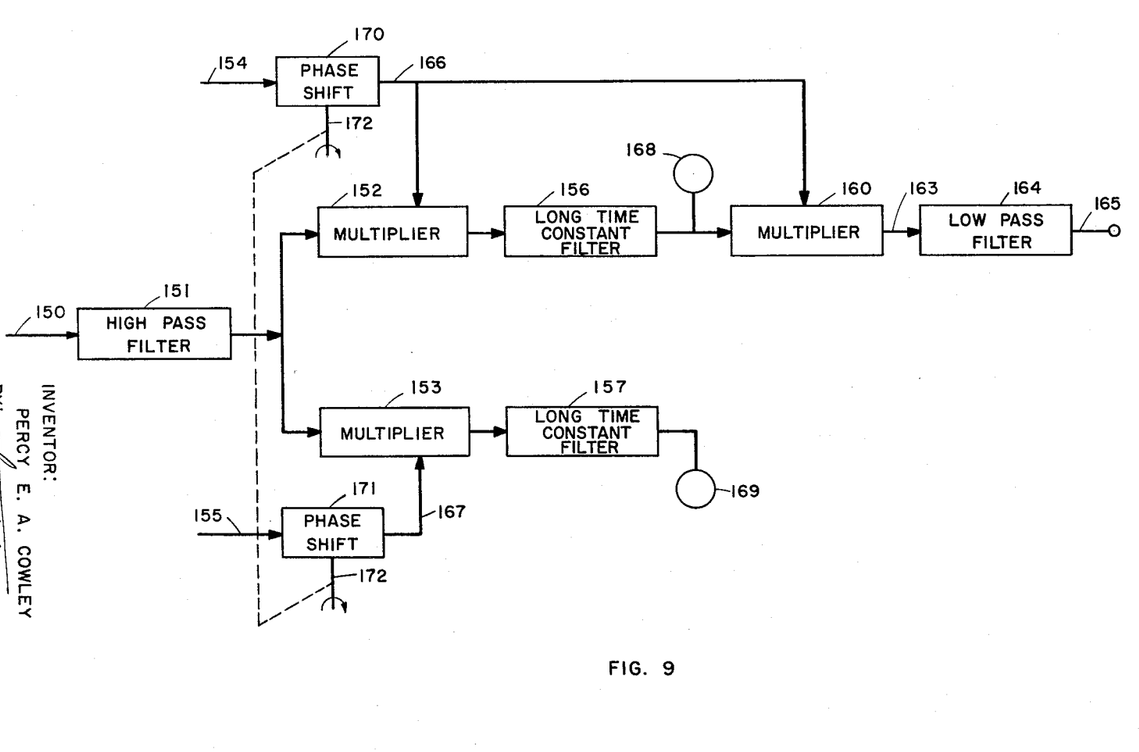

A second circuit for extracting a sinusoidal signal from a noisy signal is shown in block diagram form in FIGURE 9. In this figure components identical with those shown in FIGURE 8 have the same number. The circuit of FIGURE 9 utilizes the phase nulling method described above with reference to FIGURE 2. The only additional components in FIGURE 9 are the two phase shifting devices 170 and 171 which have a phase shaft 172 and shift the phase of the reference sine and cosine signals in the circuits 154 and 155 by an amount $\theta$. The actual phase shift is adjusted by the shaft 172 by a cut and try method until the output of the long time constant filter 157 is zero or averages zero as indicated by a measuring device 169. The output of the other long time-constant filter 156 is proportional to the amplitude of the desired sinusoidal signal and may be measured by an indicating device 168. This is apparent if one rewrites the expressions 11 and 11a using $(\phi+\alpha-\theta)$ as the trigonometric expression $$\frac{1}{2}Aab\cos(\phi+\alpha-\theta) \qquad (16)$$

$$\frac{1}{2}Aab\sin(\phi+\alpha-\theta) \qquad (16a)$$

The expression 16a is zero if $\theta=\phi+\alpha$ and 16 becomes $$\frac{1}{2}Aab$$

which is proportional to the amplitude of the desired sinusoidal signal. The reading of the phase shifting networks 170 and 171 is $\theta$ after correcting for the phase shift of the high-pass filter 151. As in FIGURE 8, the multiplier 160 and low-pass filter 164 enable one to reconstruct the desired sinusoidal signal $$\frac{1}{2}A^2a\sin(\omega t+\phi)$$

The systems shown in FIGURES 8 and 9 are essentially filters but have many advantages over ordinary filters. The above-described systems reject all frequencies other than the desired sinusoidal signal while preserving the original phase of the sinusoidal signal. In addition, the response of the systems to changes in the amplitude of the sinusoidal signal is equal to the direct current response of the filters 156 and 157.

While specific systems have been described in detail many changes can be made in this invention by those skilled in the art and accordingly this invention should only be limited to its broad spirit and scope.

I claim as my invention:

1. An apparatus for determining the dynamic response of a control system comprising: apparatus for generating electrical sine and cosine waves; control means responsive to one of said waves for disturbing the control system in response to said one wave; measuring means for measuring the control system response at predetermined points to said disturbance and supplying said response as electrical signals; filtering circuits for removing all of the frequencies in said electrical signals below a predetermined frequency; circuit means for multiplying each of said filtered electrical signals by individually said sine and cosine waves; computer means responsive to the outputs of said circuit means for integrating said outputs over a period equal to at least a few cycles of said waves and supplying an electrical signal proportional to both the sine wave component and cosine wave component of the system response; and additional means for vectorially adding said integrated results of the sine and cosine waves to obtain a vector whose magnitude is proportional to the response of the control system and whose phase angle is proportional to the phase lag of the system.

2. Apparatus for determining the dynamic response of a system which comprises: means for generating a sine reference signal and a cosine reference signal of a common, uniform frequency; means responsive to one of said reference signals for disturbing said system in accordance with said one signal; means for measuring the response of said system and producing a response signal; means for filtering said response signal to substantially remove the low frequency components caused by the normal drift of the system and by any changes in the level of the system response; means for multiplying each of said reference signals individually with said filtered response signal; and means for individually determining the average rate of increase of each of the resulting products of said multiplying means over a time greater than a few periods of the said reference signals.

3. Apparatus as defined in claim 2 wherein the last-mentioned means includes integrating means.

4. In combination with apparatus as defined in claim 2, means for combining vectorially the average rates determined by the last-mentioned means to obtain a single vector having an amplitude which is proportional to the response of the system and an angle which is indicative of the phase lag of the system response to said disturbance.

5. Apparatus as defined in claim 2 wherein said reference signals are electrical signals and the said means for disturbing the system includes a controller operatively connected to the system to control a variable thereof.

6. Apparatus for determining the dynamic response of a system which comprises: means for generating electrical sine and cosine reference signals of a common, uniform frequency; means responsive to one of said reference signals for disturbing said system in accordance with said one reference signal; means for measuring the response of said system at a predetermined point in the system and producing an electrical response signal; a high-pass filter connected to said measuring means for filtering said response signal and removing all response signal components of frequency below a predetermined value which is lower than said common frequency; separate multiplying means for simultaneously multiplying said sine and cosine reference signals individually by the resulting filtered response signal; separate means for simultaneously integrating the products of said multiplying means over a time greater than a few periods of the said common frequency; and means for vectorially combining the integrals of said separate integrating means to produce a vector having an amplitude which is proportional to the response of the system and an angle which is indicative of the phase lag of the system response to said disturbance.

7. Apparatus for extracting a sinusoidal signal from a noisy electrical signal having a uniform frequency which comprises: a first input circuit carrying said noisy signal; means including second and third input circuits for generating sine and cosine reference signals of the said uniform frequency; means connected to said input circuits for multiplying said reference signals individually by said noisy signal; low-pass filter means having a long time-constant connected to said multiplying means for passing only smoothed values of the products of said multiplying means; and means for combining said smoothed values of the products and thereby generating the sinusoidal signal corresponding to the component of the noisy signal which has said uniform frequency.

8. Apparatus as defined in claim 7 wherein said means for combining the smoothed values of the products comprises means for multiplying the respective smoothed values by the particular reference signal contained in the respective first-mentioned products to produce second products and means for adding the said second products.

9. In combination with the apparatus defined in claim 7, a high-pass filter interconnected between said first input circuit and said multiplying means for removing from said noisy signal all components of frequency below a predetermined value which is lower than said uniform frequency.

10. In combination with the apparatus defined in claim 9, a low-pass filter connected to the output of said means for combining the smoothed values of the products for removing from the output of the combining means all components of frequency higher than a predetermined value above said uniform frequency, the last-mentioned low-pass filter having a filter characteristic which is the inverse of the said high-pass filter about the said uniform frequency.

11. Apparatus for extracting a sinusoidal signal from a noisy electrical signal having a uniform frequency which comprises: an input circuit carrying said noisy signal; means for generating at least one sinusoidal reference signal of said uniform frequency; adjustable phase-shifting network means connected to said generating means and including first and second output circuits for producing in said output circuits, respectively, phase-shifted reference sinusoidal signals differing in phase by 90°; means connected to said input circuit and to said output circuits for multiplying said phase-shifted reference signals individually by said noisy signal; low-pass filter means having a long time constant connected to said multiplying means for passing only smoothed values of the products of said multiplying means; additional multiplying means connected to one of said low-pass filter means and to one of said output circuits for multiplying the smoothed value of one said products with the phase-shifted reference signal contained in the said product to produce a second product; and measuring means connected to the output of at least one of said low-pass filter means for measuring the output therefrom.

12. In combination with the apparatus defined in claim 11, a high-pass filter interconnected between said input circuit and said multiplying means for removing from said noisy signal all components of frequency below a predetermined value which is lower than said uniform frequency.

13. In combination with the apparatus defined in claim 12, a low-pass filter connected to the output of said additional multiplying means for removing from the second product all components of frequency higher than a predetermined value above said uniform frequency, the last-mentioned low-pass filter having a filter characteristic which is the inverse of said high-pass filter about the said uniform frequency.

14. A method of determining the dynamic response of a system comprising:
(a) generating a pair of reference signals one of which varies as a sine function and the other of which varies as a cosine function;
(b) disturbing the system with one of said pair of signals;
(c) measuring the response of the system and producing a response signal;
(d) individually multiplying each of said reference signals by said response signal;
(e) integrating the products of said multiplication over a time period greater than a few periods of said reference signal; and
(f) vectorially combining the results of the integration to obtain a single vector representing the magnitude and phase shift of the measured system response.

15. The method of claim 14 including the step of filtering the system response signal to substantially remove all frequencies below a predetermined value before the system response signal is multiplied by each of said reference signals.

16. A method of determining the dynamic response of a system comprising:
(a) generating a first signal which varies as a sinusoidal function;
(b) disturbing the system in accordance with said sinusoidal function;
(c) measuring the response of said system and producing a response signal;
(d) generating a second sinusoidal signal with the same frequency as said first signal;
(e) filtering said response signal to substantially remove any frequency component of the signal due to normal drift and to any changes in the level of the system response;
(f) multiplying said filtered response signal by said second sinusoidal signal and integrating the resulting product over a time greater than a few periods of said first signal;
(g) adjusting the phase of said second sinusoidal signal until the integrated product has an average magnitude substantially equal to zero;
(h) further shifting the phase of said second sinusoidal signal by 90°; and
(i) recording the resulting integrated product whereby the dynamic response of the system is a vector whose magnitude is proportional to the average slope of the recorded integrated product and whose phase angle is the final phase angle of said second sinusoidal signal.

17. A method of extracting a sinusoidal signal of known frequency from a noisy electrical signal comprising:
(a) generating a pair of sinusoidal reference signals of said known frequency which differ in phase by 90°;
(b) multiplying each of said reference signals by said noisy signal;
(c) filtering the signals resulting from said multiplications by low pass filters having long time constants to produce smoothed values of said signals resulting from said multiplication;
(d) simultaneously shifting the phase of said pair of reference signals until the average output of one of said low pass filters is substantially zero; and
(e) then measuring the output of the other low pass filter, whereby the amplitude of said sinusoidal signal is proportional to the measured output and the phase angle of said sinusoidal signal is the phase shift of said reference signals.

18. The method of claim 17 including the step of filtering said noisy signal to substantially remove all low frequency components of said noisy signal below a predetermined value.

19. The method of claim 17 including the step of multiplying the output signal from said other low pass filter by the phase-shifted reference signal contained in said output signal, the product of the last mentioned multiplication resulting in a signal which is proportional to the desired sinusoidal signal.

20. The method of claim 19 including the step of filtering said noisy signal to substantially remove all low frequency components of said noisy signal below a predetermined value.

21. The method of claim 20 including the step of filtering the product of said last mentioned multiplication by a filter having a filter characteristic inverse to that used to remove the low frequency components of said noisy signal.

22. A method of extracting a sinusoidal signal of known frequency from a noisy electrical signal comprising:
(a) generating a pair of sinusoidal reference signals of said known frequency which differ in phase by 90°;
(b) multiplying each of said reference signals by said noisy signal;
(c) filtering the signals resulting from said multiplications by low pass filters having long time constants to produce smoothed values of said signals resulting from said multiplication;

(d) multiplying the respective smoothed values by the particular reference signal used in the first said multiplication; and (e) adding the resulting products.

23. The method of claim 22 including the step of filtering said noisy signal to substantially remove all low frequency components of said noisy signal below a predetermined value.

24. The method of claim 23 including the step of filtering the product of said last mentioned multiplication by a filter having a filter characteristic inverse to that used to remove the low frequency components of said noisy signal.

25. Apparatus for determining the dynamic response of a system which comprises: means for generating a sine reference signal and a cosine reference signal of a common, uniform frequency; means responsive to one of said reference signals for disturbing said system in accordance with said one signal; means for measuring the response of said system and producing a response signal; means for multiplying each of said reference signals individually with said response signal; means for individually determining the average rate of increase of each of the resulting products of said multiplying means over a time greater than a few periods of the said reference signals; and means for combining vectorially the average rates determined by the last-mentioned means to obtain a single vector having an amplitude which is proportional to the response of the system and an angle which is indicative of the phase lag of the system response to said disturbance.

References Cited by the Examiner
UNITED STATES PATENTS

| | | | |
|---|---|---|---|
| 2,580,148 | 12/51 | Wirkler | 235—181 |
| 2,710,943 | 6/55 | Doelz | 235—181 |
| 2,722,659 | 11/55 | Dickey et al. | 324—57 |
| 2,907,400 | 10/59 | Swafford | 235—181 XR |
| 2,919,399 | 12/59 | Brown et al. | 324—57 |

MALCOLM A. MORRISON, *Primary Examiner.*

ABRAM BERLIN, WALTER W. BURNS, Jr., DARYL W. COOK, *Examiners.*